United States Patent [19]
Bryan, III

[11] Patent Number: 6,047,531
[45] Date of Patent: Apr. 11, 2000

[54] APPARATUS FOR CUTTING BRUSH

[76] Inventor: William Bryan, III, P.O. Box 1663, Tifton, Ga. 31793

[21] Appl. No.: 09/227,784

[22] Filed: Jan. 8, 1999

[51] Int. Cl.⁷ .......................... A01D 34/24; A01D 34/42; A01D 34/63

[52] U.S. Cl. .................. 56/15.2; 56/15.8; 56/10.2 A; 37/104; 37/16

[58] Field of Search .................. 37/104, 16; 56/10.8, 56/DIG. 11, 11.9, 15.7, 15.8, 15.9, DIG. 3, DIG. 10, 15.2, 10.2 A, 10.2 R; 701/50; 104/2, 4, 307

[56] References Cited

U.S. PATENT DOCUMENTS

| | | |
|---|---|---|
| D. 281,071 | 10/1985 | McCray . |
| 2,786,320 | 3/1957 | Larson . |
| 4,074,510 | 2/1978 | Teagle . |
| 4,713,898 | 12/1987 | Bull et al. . |
| 4,713,930 | 12/1987 | Whiting . |
| 4,996,830 | 3/1991 | Davison . |
| 5,123,462 | 6/1992 | Davision . |
| 5,174,098 | 12/1992 | Emery . |
| 5,210,997 | 5/1993 | Mountcastle, Jr. ............ 56/15.2 |
| 5,392,593 | 2/1995 | Emery . |
| 5,511,368 | 4/1996 | Kocher ........................ 56/15.2 |
| 5,775,075 | 7/1998 | Dannar ........................ 56/15.2 |

OTHER PUBLICATIONS

Progressie Railroad, Emery Tree Service—"Big Ben" Dual Brush, Track Yearbook & Buyers' Guide, 1994–95, p. 75, Murphy–Richter Publishing Company, Chicago, Il.

Progressive Railroad, Kershaw–Brushcutter 32, Track Yearbook & Buyers Guide, 1994–95, p. 76, Murphy-Richter Publishing Company, Chicago, Il.

*Primary Examiner*—Robert E. Pezzuto
*Assistant Examiner*—Arpad Fabian Kovacs
*Attorney, Agent, or Firm*—Brian D. Bellamy

[57] ABSTRACT

An apparatus for cutting vegetation under railway tressels and roadways that includes a vehicle chassis having a turntable body mounted thereon. A primary control station is mounted on the turntable body along with a main boom with a vegetation cutting head attached and a second elevating boom with a secondary control station suspended therefrom. Operators man each of the control stations, and the main boom and elevating boom are hydraulically controlled from either of the control stations as the operators cut vegetation from about railway tressels or roadway overpasses while communicating via a two-way intercom system between the control stations. When cutting below the line of sight of the operator in the primary control station, the cutting head is controlled by the secondary control station operator or is lowered by the elevating boom to a level giving a clear view of the vegetation being cut.

17 Claims, 6 Drawing Sheets

APPARATUS FOR CUTTING BRUSH

FIELD OF THE INVENTION

The present invention relates to mobile apparatus for cutting brush, and more particularly, to a mobile apparatus for cutting and clearing brush beneath railway tressels.

BACKGROUND OF THE INVENTION

Railroad rights of ways become over grown with vegetation and brush and must be cleared. Several apparatus mounted on mobile vehicle chassis have been used to solve the problem of cutting brush from the adjacent right-of-way surrounding a railroad track. However, no apparatus exists for safely cutting the brush underneath a railroad tressel or similar overpass. Cutting the brush below railroad tressels in areas that are covered in water and vegetation has always presented a problem requiring extensive hand work to control the growth. Known vehicle-mounted brush cutters used for removing brush from around railroad tracks have not been successful in cutting brush under the tracks because of the potential for damaging the structures underneath railroad tracks by cutting into them.

In using a typical vehicle mounted brush cutter, the operator sits in a control station in which he can view the cutting blade. From the control station the operator controls the location of the cutting blade and thereby controls where the cutting blade will cut. On known vehicle mounted brush cutters that use an expandable boom to control the cutting head, the control station is an integrated part of the turntable body. From his location above the turntable body, the operator is able to view those areas adjacent to a railroad track, but the operator is not able to see below the tracks. Therefore, the operator cannot safely cut brush below the tracks because of his obstructed view. Nothing in the prior art provides a method for cutting below railroad tracks with an unobstructed view of what is being cut.

For example, the apparatus in U.S. Pat. No. 5,392,593 to Emery is useful for cutting vegetation along railroad right-of-ways. However, that apparatus cannot cut vegetation growing below railroad tressels and overpasses. In particular, the apparatus in Emery cuts vegetation on both sides of a railroad track at various levels, but not underneath a railroad tressel or below the line of sight of the operator where obstructions exist. The apparatus has two boom assemblies with each boom assembly having a cutting member attached thereto for cutting vegetation. Therefore, the apparatus eliminates labor and time in cutting vegetation along railroad right-of-ways, but leaves the vegetation below railroad tressels to be cut using manual labor that is both expensive and time consuming.

Thus, there is a need for a mobile apparatus for cutting and clearing brush that can cut brush underneath railway tressels and below the line of sight of the primary operator of the vehicle. There is a further need for a mobile apparatus for cutting and clearing brush that has greater flexible and reach for cutting brush underneath railway tressels and also a greater distance away from railway tressels. There is yet another need for a mobile apparatus for cutting and clearing brush that can cut brush underneath a roadway overpass.

BRIEF SUMMARY OF THE INVENTION

The vehicle chassis mounted brush cutting apparatus of the present invention provides an apparatus especially suited to cutting brush from underneath railroad tracks, particularly elevated railroad tracks over swampy or low lying areas. The invention includes a vehicle chassis having a turntable body and engine mounted thereon. A first control station is integrated onto the turntable body for controlling the engine and the hydraulic moving means of the apparatus. The apparatus includes two booms that are operatively attached to the turntable body. A first boom includes three boom members and has a brush cutting head attached to the end of the third boom member. A second boom includes three boom members and has a second control station attached to the end of the second booms third member. The operator of the second control station has the ability to control the cutting head as well as the first control station operator. In its preferred use, the second control station operator controls the cutting head when his station is lowered under a railroad trestle and the cutting head is in view beneath the trestle. The two operators communicate with each other between the two control stations via a bi-directional intercom system.

Accordingly, an object of the present invention is to provide a vehicle chassis mounted brush cutting apparatus for cutting vegetation and brush beneath railroad tracks over swamp or depressed areas.

In particular it is an object of the invention to provide an apparatus adapted for transportation on roadways or railroad tracks by providing front and rear axle assemblies for both road and rail.

Another object of the invention is to provide a vehicle chassis mounted brush cutting apparatus that includes a second control station attached to a boom for providing a clear view of a cutting head being used beneath a railroad track.

Another object of the invention is to provide an apparatus having a first boom with a cutting blade attached thereto and a second boom with a second control station attached while providing stability of the apparatus on an elevated railroad track.

These and further objects of the invention will be apparent from the following description of the preferred embodiment thereof.

DETAILED DESCRIPTION

Figure 1:
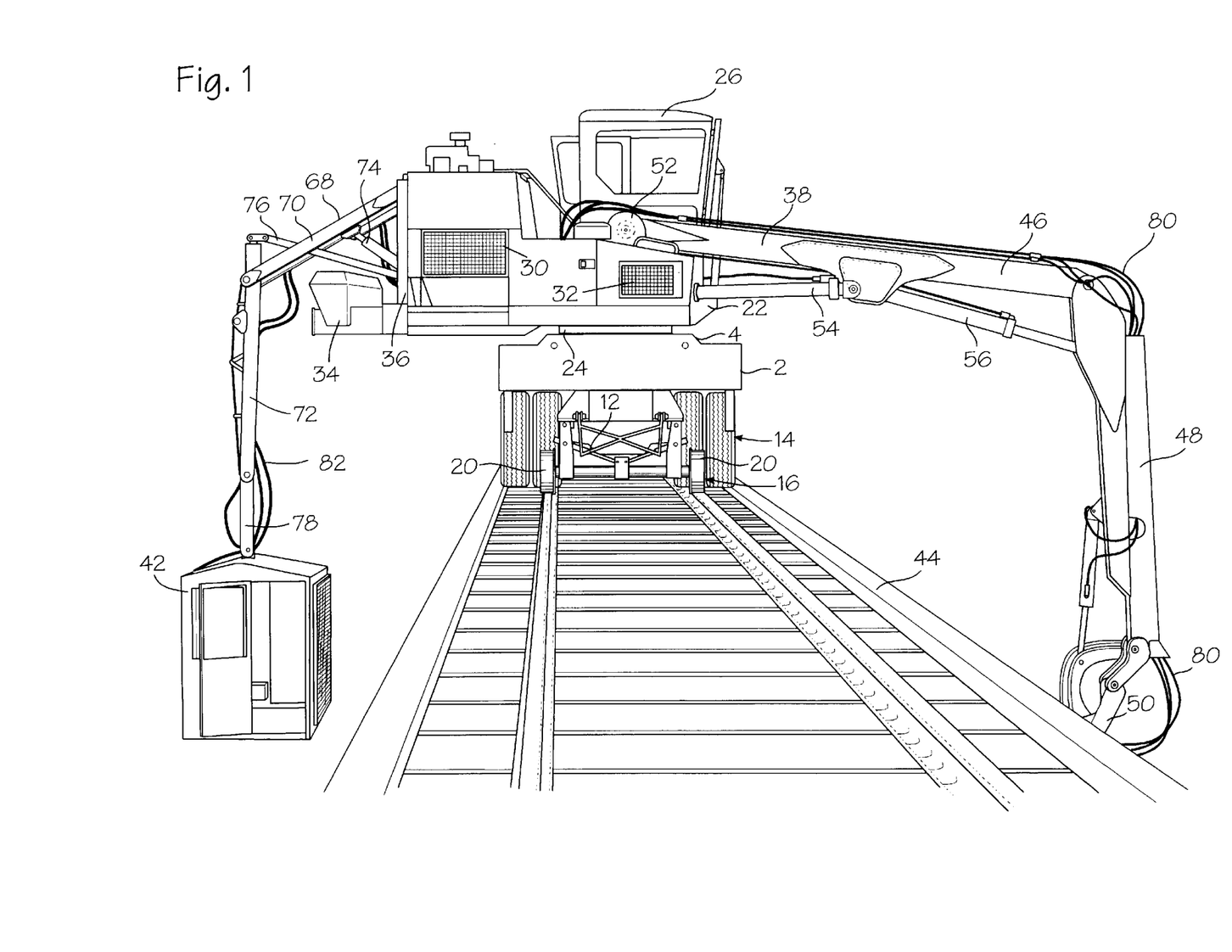
FIG. 1 is a rear view of the apparatus of the brush cutting vehicle of the present invention shown cutting beneath a railroad trestle.

Referring to the drawings, FIG. 1 illustrates the general arrangement of the present invention. The apparatus includes a mobile vehicle chassis 2 that is suited for travel on a roadway or railway. The vehicle chassis consists of a main support frame 4 similar to a tractor trailer chassis. The vehicle chassis supports the apparatus and has a front undercarriage 6 mounted to the chassis' front end that includes a front road axle assembly 8 and front rail axle assembly 10. Likewise, the vehicle chassis has a rear undercarriage 12 mounted to the chassis' rear end having a rear road axle assembly 14 and a rear rail axle assembly 16. Each undercarriage has appropriate roadway tires 18 or railway tires 20 mounted thereon for travel, thus making the apparatus suitable for travel by railway track or road.

A turntable body 22 is mounted on a turntable 24 on the top of the main support frame 4. The remainder of the present apparatus is mounted onto the turntable body such that the entire apparatus may rotate about the turntable. The turntable body includes an upper station 26 mounted thereon that is a primary control station for the operation of the apparatus. An engine support frame 28 is part of the same structure as the turntable body and supports an engine 30, hydraulic pumps 32, and counter weight system 34. A typical engine used by the invention is a Cummings 170 horsepower diesel engine. A mounting plate 36 may be provided oil the turntable body for mounting the counter weight system. In the preferred embodiment, an automatic counter weight system is used in which the counter weight adjusts inward and outward hydraulically according to feedback from electronic sensors measuring the allocation of weight about the perimeter of the apparatus.

Figure 2A:
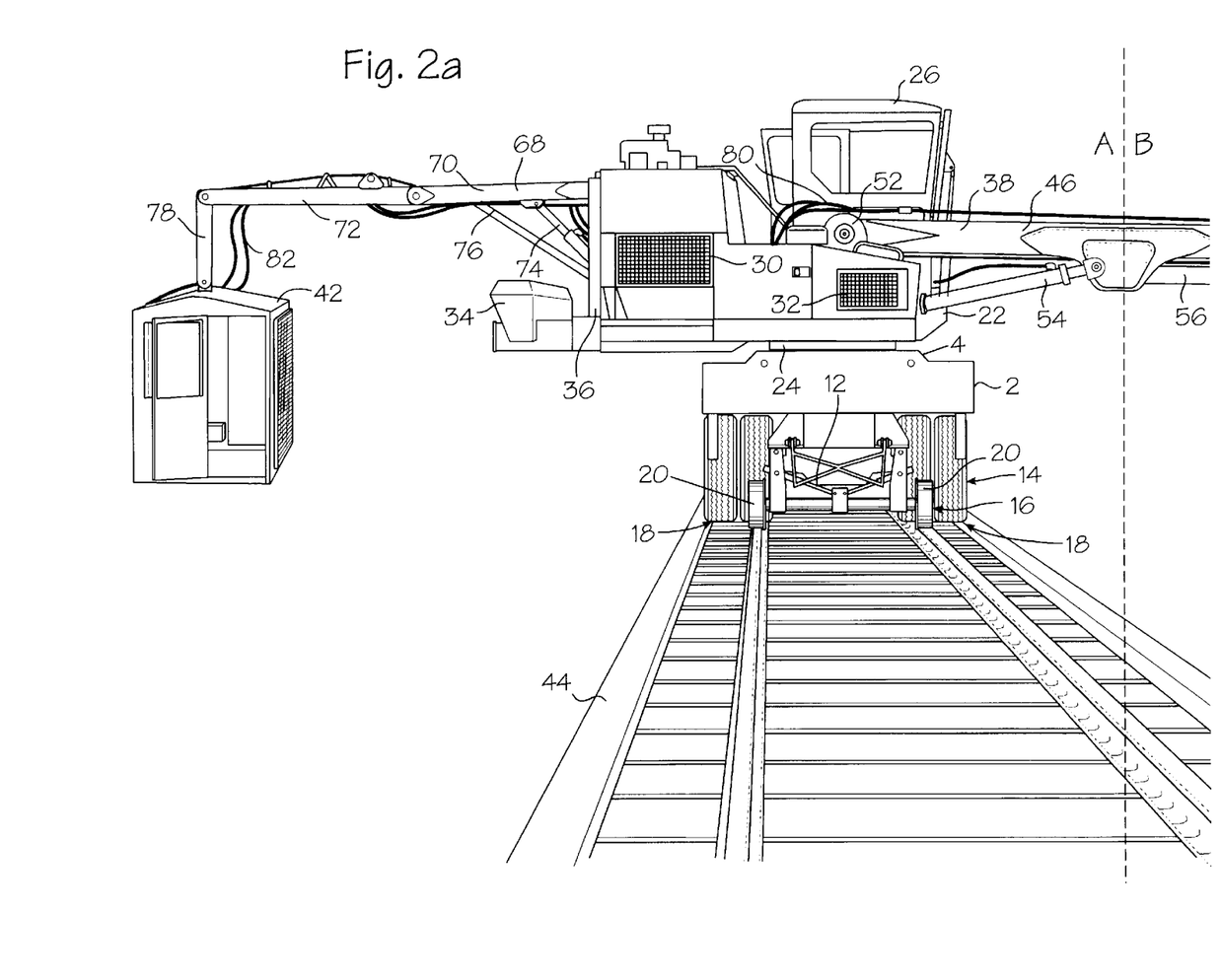
FIGS. 2a and 2b are rear views of the brush cutting vehicle of the present invention shown cutting the right of way adjacent to a railroad track.
Figure 2B:
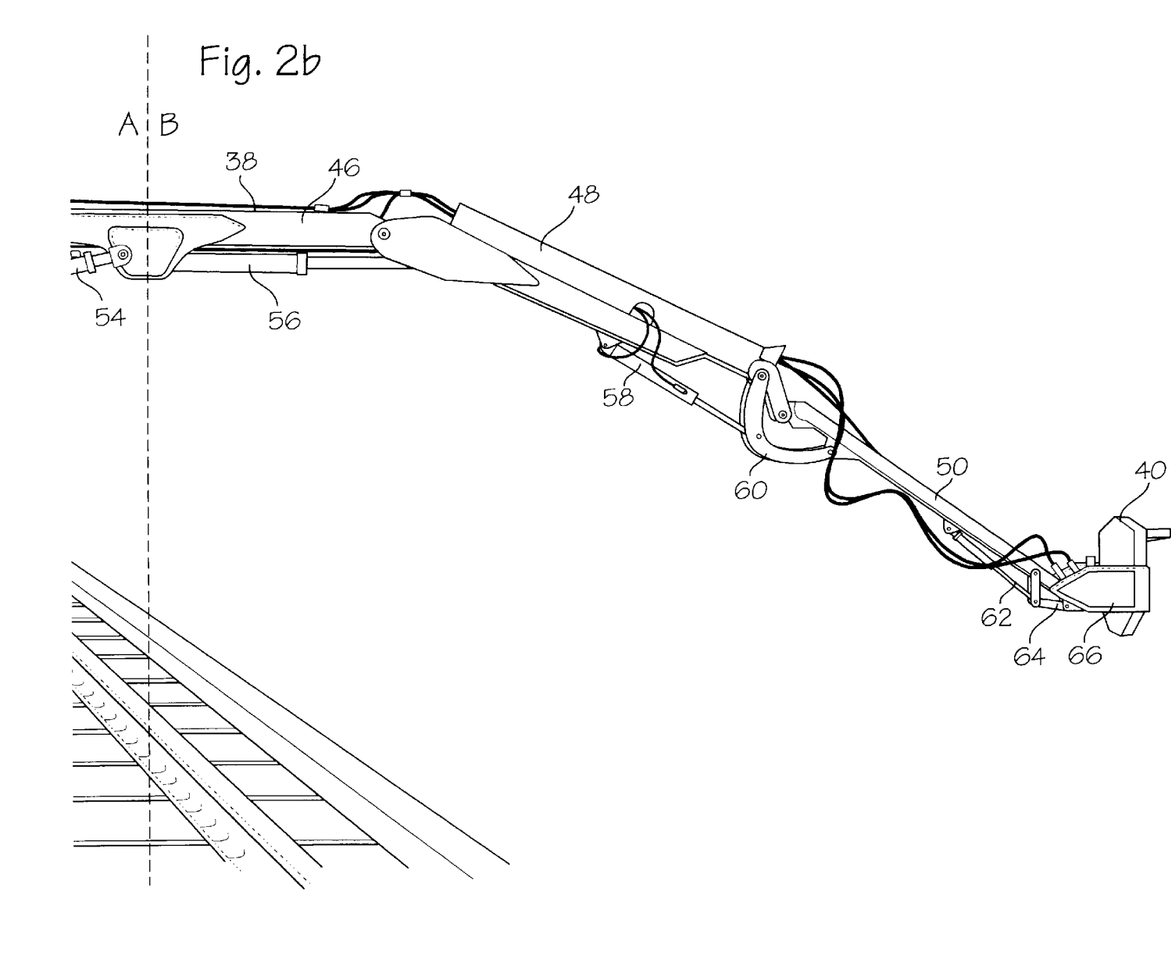
Figure 3:
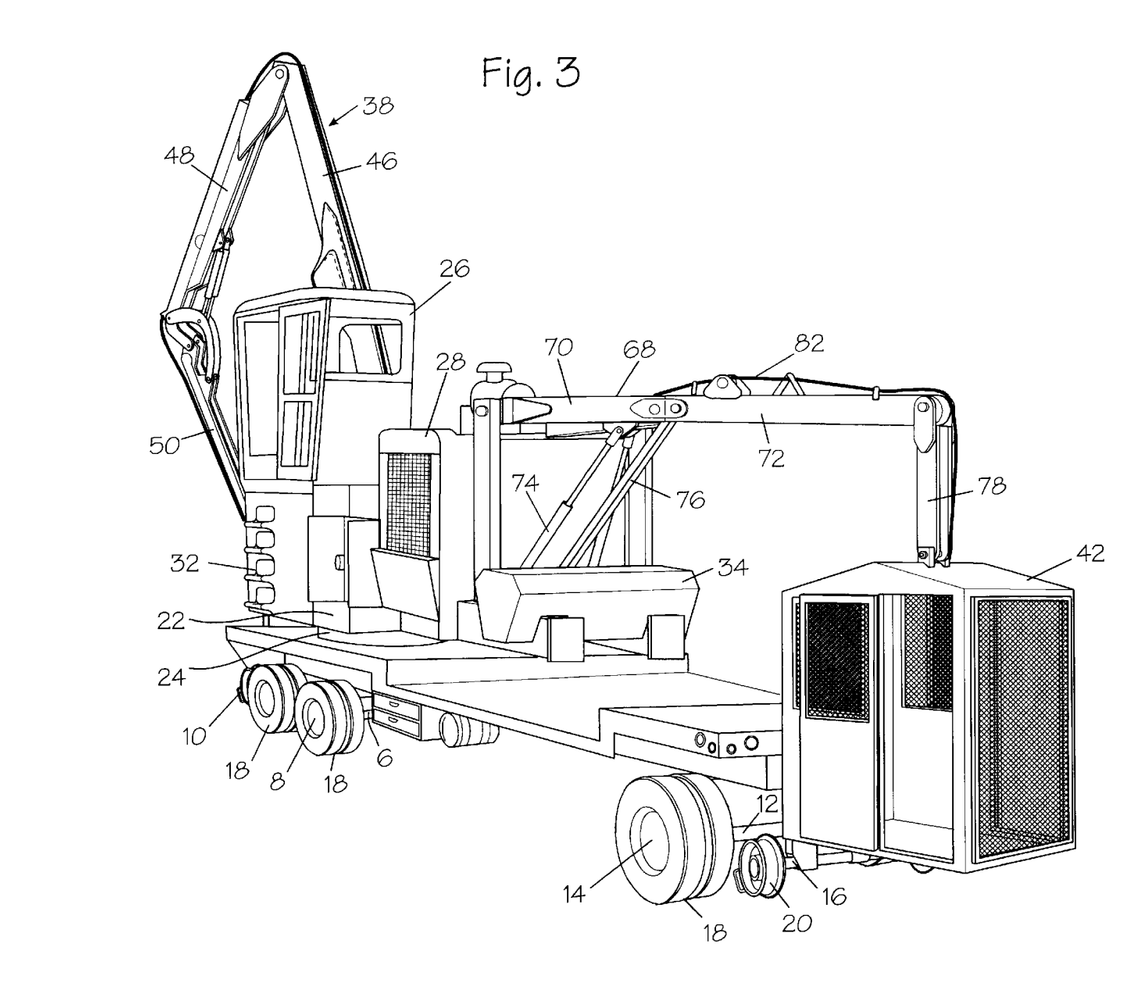
FIG. 3 is a perspective view of the apparatus traversing along a roadway.
Figure 5:
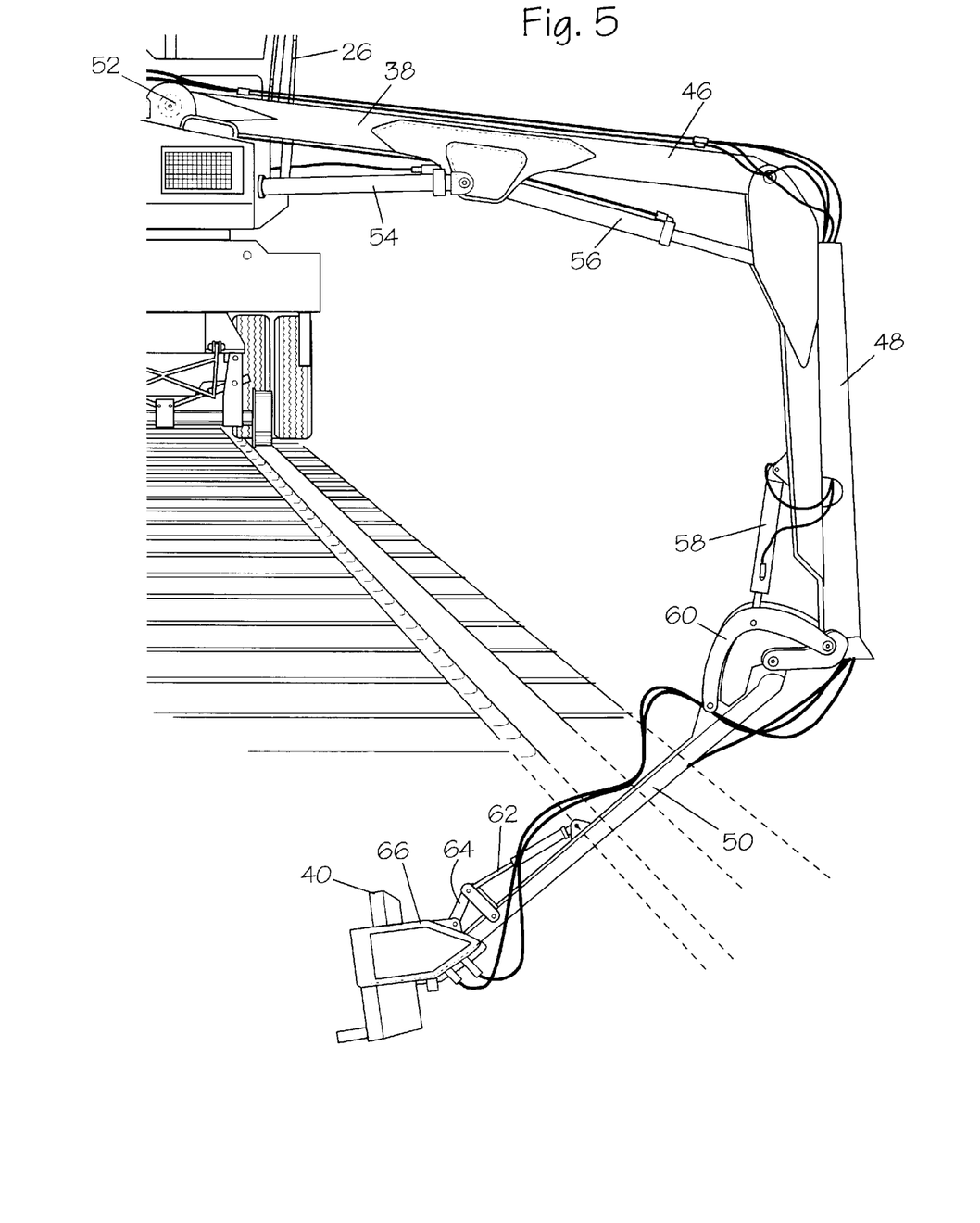
FIG. 5 is a fragmentary side view showing in more detail the first boom and the cutting head of the brush cutting vehicle of the present invention.

As shown a more detail and FIG. 2b and in FIG. 5, the present invention includes a main boom 38 having a cutting means at the end thereof. The cutting means includes a brush cutting head 40 having a housing 66 with a cutting blade attached thereto. The cutting blade is driven by a hydraulic motor contained within the housing. The cutting means is capable of cutting greater distances from the railway track using a three member main boom as shown in FIG. 2b. The apparatus provides greater flexibility in cutting along a right-of-way. Therefore, a smaller cutting head having a blade of about four feet or less in diameter may be attached to the main boom for cutting in more confined areas than allowed before the present invention.

Conventionally, three member boom assemblies, such as main boom 38, are not as desirable and two member boom assemblies. Two boom assemblies typically have been used for cutting brush along railway trackways and roadways. Prior to the present invention, it was not convenient or practical to attempt to cut brush located under railway tressels because of inability to control the cutting head while cutting under the trackway. Cutting outside of the view of the operator caused risk of cutting into tressels or causing other damage to the structure of the railway or roadway. The three member main boom 38 with cutting means 40 attached thereto and the incorporation of a second control station 42 enables the brush cutting head 40 to reach beneath a raised railway tressel 44 as shown in FIG. 5 and safely cut vegetation. The secondary control station may be positioned beneath the level of the railway tressel, whereby a second operator may have an improved view of the brush cutting head while cutting beneath the tressel. The present invention also enables the apparatus to be used for cutting beneath a raised roadway overpass.

As shown in detail in FIG. 5, the main boom 38 comprises a first main boom member 46, a second main boom member 48, and a third main boom member 50. The first main boom member is pivotally connected to the turntable body by a pin and bracket 52. A first pair of hydraulic cylinders 54 are operably connected between the turntable body 22 and the first main boom member to hydraulically control the location of the first main boom member. A second main boom member is pivotally connected to the first main boom member, and a first hydraulic cylinder 56 is operably connected between the first main boom member and the second main boom member to control the location of the second main boom member. A third main boom member is pivotally connected to the second main boom member, and a second hydraulic cylinder 58 is operably connected between the second main boom member and a knuckle swivel 60 between the second main boom member and the third main boom member to control the location of the third main boom member. The knuckle swivel permits greater flexibility in the operation of the brush cutting head 40, as depicted best in FIG. 5. A fourth hydraulic cylinder 62 is connected between the third main boom member and a control link 64 that is attached to the housing 66 of the cutting head.

Figure 4:
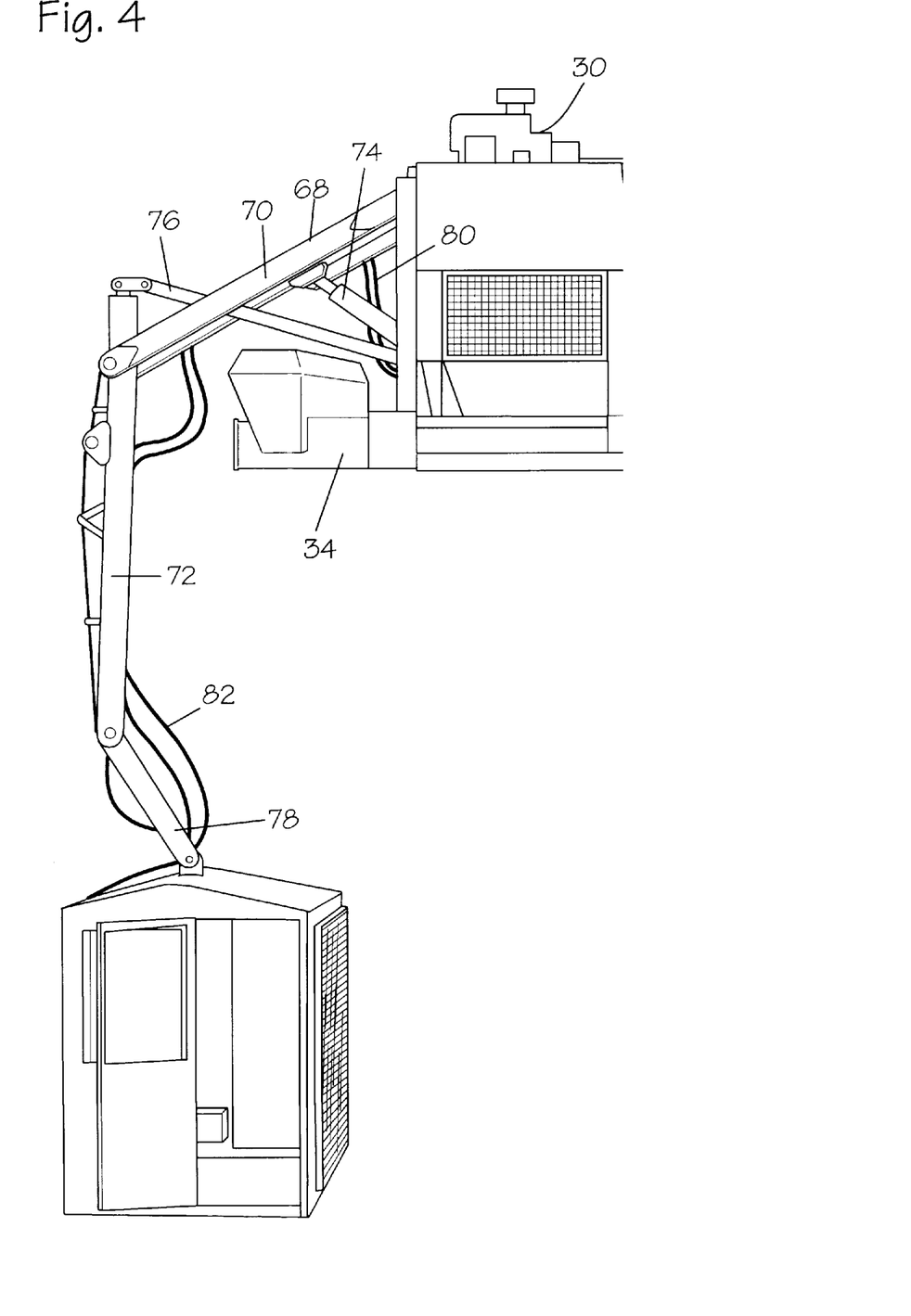
FIG. 4 is a fragmentary side view showing in more detail the second control station and its related boom of the brush cutting vehicle of the present invention.

As shown in FIG. 4, the second control station 42 is supported by an elevating boom 68 having a first elevating boom member 70 and a second elevating boom member 72. The first elevating boom member is controlled by a second pair of hydraulic cylinders 74 operably connected between the turntable body 22 and the first elevating boom member. The second elevating boom member is pivotally connected to the first elevating boom member and is controlled by the joint operation of the pivotal connection between the boom members and a push-pull tube 76 that is pivotally connected to the second boom member and the turntable body. The push-pull tube eliminates the need for further hydraulics to control the location of secondary control station, thus simplifying the operation of the present invention. The second elevating boom member is connected to the second elevating control station by a support link 78.

As shown in the Figures, hydraulic fluid lines 80 carry hydraulic fluid from the hydraulic pump system 32 to the described hydraulic cylinders 54, 56, 58, 62, and 74. Hydraulic fluid is also provided by the hydraulic lines to other hydraulically controlled features of the apparatus, namely, the cutting head motor and the automatic counter balancing system 34. Hydraulic control lines 82 are connected between the hydraulic pump system and both the primary control station 26 and secondary control station 42. Either control station may perform operations to send control signals via the hydraulic control lines. Thereby, both control stations have concurrent access to control of the moving system that includes the hydraulic cylinders and controls the location of the booms 38 and 68 and the cutting head 40.

In the arrangement described above the secondary control station 42 may be lowered hydraulically to a depth below the level of the railway tressel 44, and an operator in the secondary control station may take full control of the operation of the brush cutting head 40. FIG. 1, FIG. 4, and FIG. 5 illustrate the operation of the brush cutting apparatus while cutting under a railway tressel and while being controlled by the operator in the secondary control station who has been lowered below the plane of the trackway.

On the contrary, the second control station 42 may be positioned by a fully extended elevating boom 68 horizontally distant from the turntable body 22. FIG. 2 illustrates the operation of the brush cuttering head 40 while extended away from the railway track and being controlled by the operator in the primary control station 26. When extended horizontally away from the turntable body the secondary control station may act as another counter weight and counter balance for the main boom 38. Thereby, the main boom may be extended further away from the turntable body for cutting brush farther from the railway trackway. The counter balancing means balances the weight and leverage of the extending main boom 38 and elevating boom 68 so that the apparatus remains stable and does not roll over.

The operator stationed in the primary control station 26 and the operator stationed in the secondary control station 42 constantly communicate with each other and provide instruction for the control of the brush cutting head 40. Both operators are provided concurrent control capability over the main boom 38 and cutting head 40. The secondary control operator can control all functions of the machine except for stopping and starting the engine 30. A two-way radio and an intercom system similar to that used in commercial aircraft between pilots provides means for the necessary communication between the operators. The intercom system includes a hot microphone and a head set in each control station.

I claim:

1. An apparatus for cutting vegetation comprising:
   a vehicle chassis;
   a turntable body mounted on said vehicle chassis;
   a primary control station mounted on said turntable body;
   a main boom attached to said turntable body;
   an elevating boom attached to said turntable body;
   cutting means attached to said main boom for cutting vegetation;
   a secondary control station attached to said elevating boom;
   moving means for moving said main boom and said elevating boom and said cutting means;
   an engine means mounted on said turntable body for powering said moving means;
   communication means for communicating between said primary control station and said secondary control station.

2. An apparatus as claimed in claim 1, wherein said vehicle chassis includes a forward end and a rear end, and wherein a front rail axle assembly is mounted under said forward end of said vehicle chassis and a rear rail axle assembly is mounted under said rear end of said vehicle chassis.

3. An apparatus as claimed in claim 1, wherein said main boom includes a first main boom member, a second main boom member, and a third main boom member, and said first, second, and third main boom members include a first end and a second end, and wherein said first end of said first main boom member attaches to said turntable body and said second end of said first main boom member attaches to said first end of said second main boom member and said second end of said second main boom member attaches to said first end of said third main boom member and said second end of said third main boom member attaches to a housing of said cutting means.

4. An apparatus as claimed in claim 1, wherein said elevating boom includes a first elevating boom member, a second elevating boom member, and a support link, and said first and second elevating boom members include a first end and a second end, and said support link includes a first end and a second end, and wherein said said first end of said first elevating boom member attaches to said turntable body and said second end of said first elevating boom member attaches to said first end of said second elevating boom member and said second end of said second elevating boom member attaches to said first end of said support link and said second end of said support link attaches to said secondary control station.

5. An apparatus as claimed in claim 1, wherein said apparatus for cutting vegetation further includes a counter balance means mounted on said turntable body for balancing said main boom and said elevating boom.

6. An apparatus as claimed in claim 1, wherein said communication means includes an intercom system having a hot microphone and a head set in both the primary control station and the secondary control station.

7. An apparatus as claimed in claim 1, wherein said moving means is alternately controlled by said primary control station or by said secondary control station.

8. An apparatus for cutting vegetation comprising:
   a vehicle chassis;
   a turntable body mounted on said vehicle chassis and including a forward end and a rear end;
   a primary control station mounted on said forward end of said turntable body;
   a main boom having a first main boom member, a second main boom member, and a third main boom member, and said first, second, and third main boom members include a first end and a second end, and wherein said first end of said first main boom member is attached to said turntable body and said second end of said first main boom member is attached to said first end of said second main boom member and said second end of said second main boom member attaches to said first end of said third main boom member;
   an elevating boom having a first elevating boom member, a second elevating boom member, and a support link, and said first and second elevating boom members include a first end and a second end, and said support link includes a first end and a second end, and wherein said first end of said first elevating boom member is attached to said turntable body and said second end of said first elevating boom member is attached to said first end of said second elevating boom member and said second end of said second elevating boom member is attached to said first end of said support link;
   cutting means for cutting vegetation that includes an outer housing attached to said main boom;
   a secondary control station attached to said support link;
   moving means for moving said main boom and said elevating boom and said cutting means;
   an engine means mounted on said turntable body for powering said moving means;
   communication means for communicating between said primary control station and said secondary control station.

9. An apparatus as claimed in claim 8, wherein said first main boom member is pivotally attached to said turntable body, said second main boom member is pivotally attached to said first main boom member, said third main boom member is pivotally attached to said second main boom member, and said housing of said cutting means is pivotally attached to said third main boom member, and wherein said first elevating boom member is pivotally attached to said rear end of said turntable body, said second elevating boom member is pivotally attached to said first elevating boom member, said support link is pivotally attached to said second elevating boom member.

10. An apparatus as claimed in claim 8, wherein said moving means includes a hydraulic pump system connected to said engine means, a first pair of hydraulic cylinders connected between said turntable body and said first main boom member, a first hydraulic cylinder connected between said first main boom member and said second main boom member, a knuckel member pivotally connected between said second main boom member and said third main boom member, a second hydraulic cylinder connected between said second main boom member and said knuckel member, a control link connected between said third main boom member and said housing of said cutting means, and a third hydraulic cylinder connected between said third main boom member and said control link.

11. An apparatus as claimed in claim 10, wherein said moving means further includes a second pair of hydraulic cylinders connected between said turntable body and said first elevating boom member, a push-pull tube pivotally connected between said turntable body and said second elevating boom member, and a hydraulic line means for carrying hydraulic fluid from said hydraulic pump system to said hydraulic cylinders and to a hydraulic motor of said cutting means.

12. An apparatus as claimed in claim 11, wherein said hydraulic line means is connected to both said primary control station and said secondary control station and may be alternatively controlled by said primary control station or by said secondary control station.

13. An apparatus as claimed in claim 8, wherein said engine means generates about 170 horsepower.

14. An apparatus as claimed in claim 8, wherein a cutting blade having a diameter of less than four feet is attached to said outer housing of said cutting means.

15. An apparatus as claimed in claim 8, wherein said apparatus for cutting vegetation further includes a counter balance means mounted on said turntable body for balancing said main boom and said elevating boom.

16. An apparatus as claimed in claim 8, wherein said communication means includes an intercom system having a hot microphone and a head set in both the primary control station and the secondary control station.

17. An apparatus for cutting vegetation comprising:
- a vehicle chassis having a forward end and a rear end and including a front rail axle assembly and a front road axle assembly mounted under said forward end of said vehicle chassis and a rear rail axle assembly and a rear road axle assembly mounted under said rear end of said vehicle chassis;
- a turntable body mounted on said vehicle chassis and including a forward end and a rear end;
- a primary control station mounted on said forward end of said turntable body;
- a main boom having a first main boom member, a second main boom member, and a third main boom member, and said first, second, and third main boom members include a first end and a second end, and wherein said first end of said first main boom member is pivotally attached to said rear end of said turntable body and said second end of said first main boom member is pivotally attached to said first end of said second main boom member and said second end of said second main boom member is pivotally attached to said first end of said third main boom member;
- an elevating boom having a first elevating boom member, a second elevating boom member, and a support link, and said first and second elevating boom members include a first end and a second end, and said support link includes a first end and a second end, and wherein said first end of said first elevating boom member is pivotally attached to said turntable body and said second end of said first elevating boom member is pivotally attached to said first end of said second elevating boom member and said second end of said second elevating boom member is pivotally attached to said first end of said support link;
- cutting means for cutting vegetation that includes a housing pivotally attached to said second end of said third main boom member and has a cutting blade having a diameter of less than four feet attached to said outer housing and rotatably driven by a hydraulic motor contained within said housing;
- a secondary control station attached to said support link;
- moving means for moving said main boom and said elevating boom and said cutting means, alternately controlled by said primary control station or by said secondary control station, and said moving means including a hydraulic pump system, a first pair of hydraulic cylinders connected between said turntable body and said first main boom member, a first hydraulic cylinder connected between said first main boom member and said second main boom member, a knuckel member pivotally connected between said second main boom member and said third main boom member, a second hydraulic cylinder connected between said second main boom member and said knuckel member, a control link connected between said third main boom member and said housing of said cutting means, and a third hydraulic cylinder connected between said third main boom member and said control link, and said moving means further including a second pair of hydraulic cylinders connected between said turntable body and said first elevating boom member, a push-pull tube pivotally connected between said turntable body and said second elevating boom member, and a hydraulic line means for carrying hydraulic fluid from said hydraulic pump system to said hydraulic cylinders and to a hydraulic motor of said cutting means;
- engine means mounted on said turntable body for powering said hydraulic pump system;
- counter balance means mounted on said rear end of said turntable body for balancing said main boom and said elevating boom;
- communication means for communicating between said primary control station and said secondary control station that includes an intercom system having a hot microphone and a head set in both the primary control station and the secondary control station.

* * * * *